United States Patent [19]

Uehara

[11] Patent Number: 5,359,587
[45] Date of Patent: Oct. 25, 1994

[54] ELECTRONIC EQUIPMENT HOUSING ASSEMBLY WITH INTEGRAL FASTENING COMPONENTS

[75] Inventor: Yukiyasu Uehara, Toda, Japan
[73] Assignee: Clarion Co., Ltd., Tokyo, Japan
[21] Appl. No.: 909,024
[22] Filed: Jul. 6, 1992

[30] Foreign Application Priority Data

Jul. 8, 1991 [JP] Japan .................. 3-167116

[51] Int. Cl.⁵ .......................................... G11B 33/02
[52] U.S. Cl. ............................ 369/75.1; 16/260; 16/268; 220/338; 369/263
[58] Field of Search .................. 369/75.1, 75.2, 263; 361/390, 391, 417, 419, 427; 16/254, 260, 268; 220/338, 337

[56] References Cited

U.S. PATENT DOCUMENTS

| | | | |
|---|---|---|---|
| 4,541,025 | 9/1985 | Sidhu et al. | 360/99.05 |
| 4,841,499 | 6/1989 | Takahashi et al. | 369/263 |
| 5,042,024 | 8/1991 | Kurosawa et al. | 369/75.1 |
| 5,132,958 | 7/1992 | Camps et al. | 369/75.1 |
| 5,208,734 | 5/1993 | Someno | 361/388 |

FOREIGN PATENT DOCUMENTS

| | | |
|---|---|---|
| 61-039975 | 3/1986 | Japan . |
| 62-142880 | 9/1987 | Japan . |
| 63-182594 | 11/1988 | Japan . |
| 152251 | 2/1989 | Japan .................. 369/263 |
| 3128974 | 12/1991 | Japan . |

OTHER PUBLICATIONS

Japanese Invention Association Technical Publication vol. 12-25, No. 87-7239, Jun. 20, 1987.
Japanese Invention Association Technical Publication vol. 13-27, No. 88-8329, Jul. 20, 1988.

Primary Examiner—Stuart S. Levy
Assistant Examiner—Paul J. Ditmyer
Attorney, Agent, or Firm—Price, Gess & Ubell

[57] ABSTRACT

An assembling structure of a case assembly and a process for assembling the case assembly are disclosed. Right-hand and left-hand supports (10) elastically support the core (1) of an apparatus in a buffered position via dampers (1a) and springs (3). The combinations of claws (11a) and notches (10h), and a claw (11) and a trapezoidal opening (10c) engage supports (10) in the width of the case assembly. An upper case (12) is fitted on the lower case (11). Combinations of claws (11d) and rectangular openings (12c), and rectangular openings (11c) and a claw (12b) fasten the two cases. Claws (12e) of the upper case (12) having tapering portions (12f) are engaged with the rear ends of the supports (10) to position the top edges of the supports (10). Claws (12h) of the upper case (12) and the claws (10i) of the supports (10) together position the front ends of the supports (10).

5 Claims, 4 Drawing Sheets

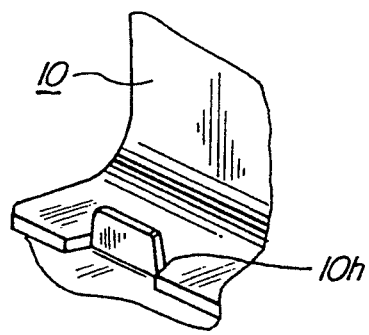
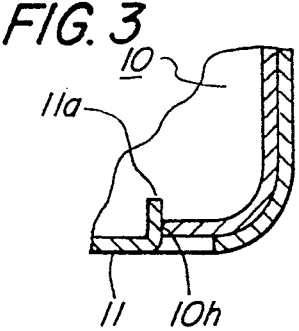
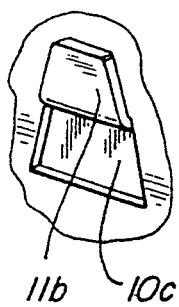
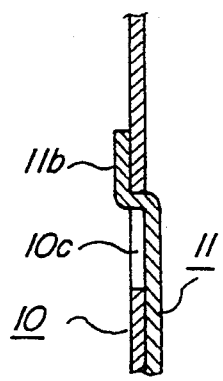
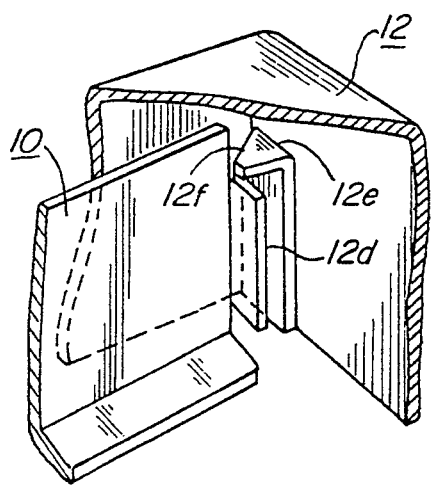
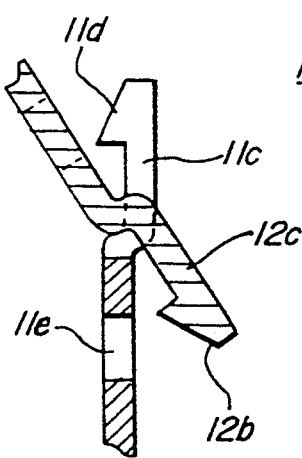
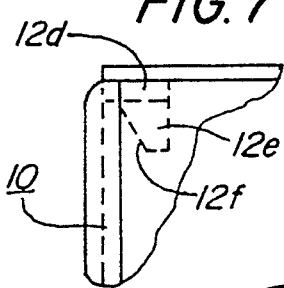
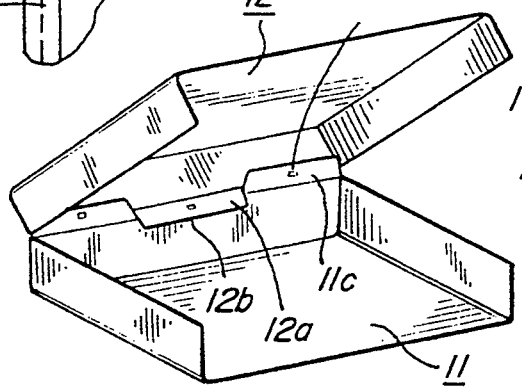

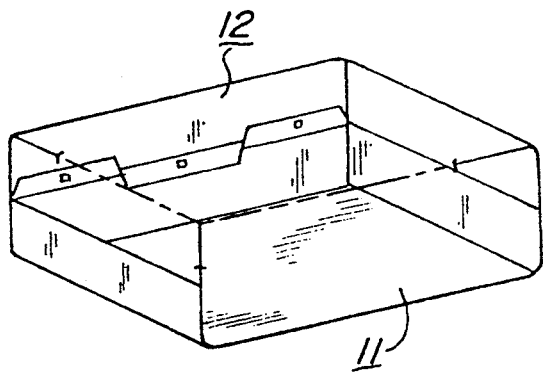
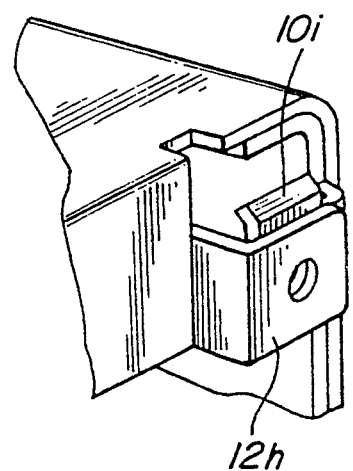
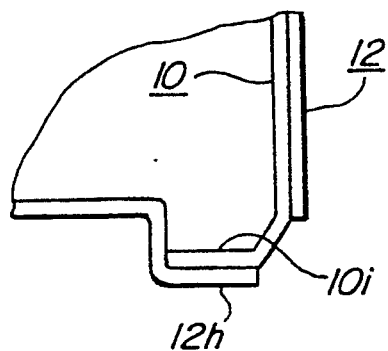
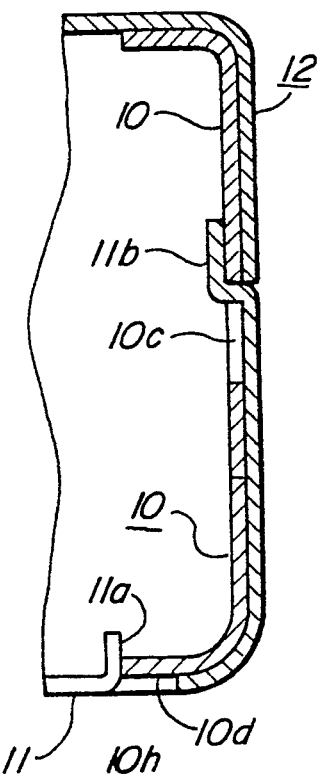
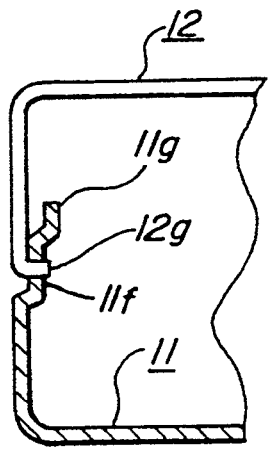

ELECTRONIC EQUIPMENT HOUSING ASSEMBLY WITH INTEGRAL FASTENING COMPONENTS

BACKGROUND OF THE INVENTION

1. Field of the Invention

The present invention relates to an assembling structure of a case containing the core of an apparatus such as an external case of a compact disc (referred to as a CD hereinafter) or an autochanger and to a process for assembling the case.

2. Description of the Related Art

Car-mounted audio apparatuses generally have vibrationproof measures for reducing an influence due to a vibration of an automotive vehicle during running of the vehicle. It has been known as embodied vibrationproof measures that a case suspends the core of an audio apparatus therein via elastic elements such as a spring and a damper. The assembling structure of such case containing the apparatus core will be described by the example of a CD autochanger hereinafter. CD autochangers are audio apparatuses which contain a plurality of CDs together, freely replace CDs on a player, and play a CD on the player. When receiving an external vibration, a CD autochanger may skip a sound of the CD or damage the core of the CD autochanger. Therefore, a sufficient care is taken in vibrationproof measures for the CD autochanger.

In a case where the case suspends the apparatus core therein in a vibrationproof state, no elastic element immediately connects the apparatus core to the case. It is because the following drawbacks are involved if the case is assembled and elastic elements are concurrently mounted within the case:

First, it is difficult to divide a work among assembly lines since it requires concurrent performance of some portions of the work. Second, since a mounting of the elastic elements in a narrow space between the interior surface of the case and the apparatus core is required, it is difficult to install such elements. Third, the elastic element may escape during assemblage of the case.

Therefore, generally supports separate from the case are prepared and elastic elements which are mounted to the supports support the apparatus core. The case is assembled while the supports are fastened within the case. In this assembling structure of the case, an assemblage of the case and a mounting of the elastic elements including an elaborate work such as a fitting of springs can be separately performed.

FIG. 16 illustrates a prior-art assembling structure of a case using such supports. In FIG. 16, the core of a CD autochanger is indicated at 1. The CD autochanger comprises at least a CD player, a loading unit for a magazine containing a plurality of CDs, and a CD-changing mechanism. Right-hand and left-hand side surfaces of the apparatus core 1 have supports 2 attached thereto. The supports 2 suspend the apparatus core 1 via elastic elements of dampers and springs. A case assembly contains the apparatus core 1 and the supports 2. The case assembly comprises a lower case 4 covering the underside of the apparatus core 1, a front panel covering the front of the apparatus core 1, an upper case 6 covering the top and the right-hand and left-hand side surfaces of the apparatus core 1, and a rear cover 7 covering the rear of the apparatus core 1.

Each of the side surfaces of the apparatus core 1 has two dampers 1a attached to front and rear ends of that side surface, and a claw 1b situated between the dampers 1a. The dampers 1a which are provided for absorbing a vibration of the apparatus core 1 during running of an automotive vehicle are made with corrugated rubber rings. Central portions of the dampers 1a define insertion openings. On the other hand, the hooks 1b are provided for seizing one end of springs 3 cancelling the weight of the apparatus core 1.

A surface of each of the supports 2 opposed to the apparatus core 1 has pins 2a and a claw 2b. The pins 2a fit the insertion openings defined at the centers of the dampers 1a. The claw 2b seizes the other end of a suspension spring 3. The four corners of that support 2 define screwed holes 2g for fastening the upper case 6. The center of the front end of the support 2 defines a screwed hole 2h for fastening the front panel 5. A bottom part and a rear end of the support 2 are bent toward the interior of the case assembly to form bent portions 2c and 2d. Opposite ends of the bent portion 2c define screwed holes 2e for fastening the lower case 4. On the other hand, upper and lower ends of the bent portion 2d define screwed holes 2i for fastening the rear cover 7.

Parts of the lower case 4 opposed to the screwed holes 2e define screwed holes 4a. Parts of opposite ends of the front panel 5 opposed to the screwed holes 2h in the supports 2 define screwed holes 5b. Parts of opposite sidewalls of the upper case 6 opposed to the screwed holes 2g in the supports 2 define screwed holes 6b. Parts of the rear cover 7 opposed to the screwed holes 2i in the supports 2 define screwed holes 7b.

In the above-described prior-art assembling structure of the case assembly, the case assembly is assembled in the following manner. The pins 2a on the supports 2 are fitted into the central openings in the dampers 1a of the apparatus core 1. The springs 3 are hooked on the claws 1b of the apparatus core 1 and the claws 2b of the supports 2. Thereby, the right-hand and left-hand supports 2, 2 support the apparatus core 1 therebetween at a degree of freedom.

Then, the supports 2 sandwiching the apparatus core 1 are placed on the lower case 4, and screws 2f are passed through the screwed holes 2e in the supports 2 and the screwed holes 4a in the lower case 4 to fasten the supports 2 to the lower case 4. In this state, the front panel 5 is applied to the front of the apparatus core 1, and the screws 5a are passed through the screwed holes 2h in the supports 2 and the screwed hole 5b in the front panel 5 to fasten the front panel 5 to the supports 2. Then, the upper case 6 is fitted on the top of the apparatus core 1 and the exterior surfaces of the supports 2 from above, and the screws 6a are passed through the screwed holes 2g in the supports 2 and the screwed holes 6b in the upper case 6 to fasten the upper case 6 to the supports 2. At last, the rear cover 7 is applied to the rears of the apparatus core 1, the supports 2 and the upper cover 6, and the screws 7a are passed through the screwed holes 2i in the supports 2 and the screwed holes 7b in the rear cover to fasten the rear cover 7 to the supports 2.

Thus, in the prior-art of FIG. 16, the fitting together of the supports 2 and the apparatus core 1 and the fitting of this assembly into the case assembly while the case assembly is assembled can be performed in separate steps. Thus, the assemblability of the case assembly is good. In addition, even when the case assembly is opened for maintenance and inspection of the CD autochanger, neither the springs nor the dampers escape from the case assembly at the time the case assembly is opened.

In addition to the above-described prior-art, there have been proposed as examples of the assembling structure of the case those disclosed in Japanese unexamined utility model application publication SHO. 62-142880, Japanese Invention Association technical publication No. 87-7239, Japanese unexamined utility model application publication SHO. 63-182594, Japanese Invention Association technical publication No. 88-8329 and Japanese unexamined utility model application publication HEI. 3-128974.

However, the above-described prior-art assembling structures of the case involve the following problems to be solved. These structures employ a large number of screws as means for fastening components of the case to one another. Therefore, the number of components is very large and mountings of the components are troublesome. In addition, troubles such as a slackness and/or a slippage of a screw often occur. Thus, the stability of a prior-art case is doubtful for a case containing an accurate apparatus core.

In addition, an air driver or the like which is often hung from above is generally often employed for the above-described assembly. Accordingly, an intermediate of a product under assemblage must be appropriately rearranged for screwing so that a portion to be screwed is directed upwards. That is, the intermediate of the product must be rearranged so that said portion is always screwed downwards regardless of different directions of screwing. However, since the intermediate of the product has an uncovered important part or a component under assemblage, it is very difficult to handle the intermediate of the product. Accordingly, there is a problem in that a part of the intermediate of the product may slip off or be deformed during rearrangement of the intermediate of the product. In addition, the screwing requires jigs for positioning the intermediate of the product which has been rearranged and for facilitating insertions of screws, so that an assemblage of the product is time-consuming and the efficiency of work cannot be increased.

In addition, a screw may fall into the case assembly due to a miss in the screwing or a slackness due to a vibration. In this case, the screw may touch the apparatus core due to a vibration or the like to short-circuit a circuit of the apparatus core or damage a vibrationproof function of the apparatus core and the fall of the screw may cause a secondary failure.

In addition, none of the prior art disclosed in the above Japanese unexamined utility model application publications and Japanese Invention Association technical publications discloses a support for the apparatus core to be provided between the case assembly and the apparatus core. In a word, this prior art share the drawbacks described herein above the description of the prior art as shown in FIG. 16.

SUMMARY OF THE INVENTION

The present invention was made for eliminating the above-described drawbacks in the prior art. An object thereof is to provide a reliable assembling structure of a case by which a case assembly is easy to assemble and which has a good function of protecting an apparatus core.

In order to overcome the above-described problem, the invention is characterized in that in an assembling structure of a case containing the core of an electronic apparatus the case comprises at least an upper case portion and a lower case portion, each of the case portions has a claw and an opening engaging the claw. In the assembling structure of the case, the upper case portion is fitted on the lower case portion to assemble the case so that the claw engages the opening. In addition, there is provided in the case a support connecting and supporting at least two of the upper case portion and the lower case portion.

The assembling structure is further characterized in that the support has a claw and an opening which engage the claws and the openings of the upper case and the lower case.

The invention is characterized in that at least one of the upper and lower case portions comprises a rear wall, and that the rear wall has a projection and a recess, and that the projection and the recess have a claw and an opening which engage each other.

The assembling structure is characterized in that at least one of the upper and lower case portions comprises side walls, and that at least one of the upper and lower case portions has a claw and an opening so that the supports are fastened to the sidewalls, and that the supports have openings and claws which engage the claw and the opening of the one of the upper and lower case portions.

The assembling structure is also characterized in that an elastic element maintaining the position of the apparatus core is provided between each of the supports and the apparatus core.

The assembling structure is further characterized in that the apparatus core is a CD autochanger comprising at least a CD player, a magazine containing a plurality of CDs and a changing mechanism transferring CDs between the magazine and the CD player and replacing a CD on the player.

The invention also includes a process for assembling a case in which a case containing the core of an electronic apparatus comprises at least an upper case portion, a lower case portion and supports connecting and supporting the upper and lower case portions, each of the supports having a claw and an opening, each of the case portions having a claw and an opening which engage the claws and the openings of the supports, and a claw and an opening which engage a claw and an opening of the other case portion, the process being characterized in that it comprises a first assembling step of erecting the supports to opposite sidewalls of the lower case portion by means of engaging the claws and the openings of the supports with the claw and the opening of the lower case portion, a second assembling step of fitting the rear walls of the upper and lower case portions together by means of engaging the claw with the opening of the case portions, and a third assembling step of fitting opposite sidewalls of the upper and lower case portions together via the supports.

The process is characterized in that it further comprises a fourth assembling step of fitting front walls of the upper and lower case portions each other subsequent to the third assembling step.

The case comprising in addition to the upper and lower case portions a front panel mounted on the front surfaces of the case portions, the process being characterized in that it further comprises a step of mounting the front panel on the front surfaces of the case portions subsequent to the third assembling step.

In the above-described assembling structure of the case according to the present invention, the supports and the upper and lower case portions engage one another by means of the claws and the openings without the need for screwing. In addition, since the upper and lower case portions have the claws and the openings engaging each other, the supports can be accurately positioned within the case.

In addition, since the process for assembling the case according to the present invention is not a conventional assembling process employing a large number of screws, the assembling steps are very simplified and a problem that a component will slip off during the assemblage is overcome. In addition, the process can prevent a trouble such as a slackness or slippage of screws to cause no secondary failure.

In addition, in the process for assembling the case according to the present invention, the supports simply support the apparatus core and the supports supporting the apparatus core are then simply fitted into the lower case portion. In other words, the elements can be sequentially assembled. Therefore, two assembly lines can be separately provided. In addition, even if a work is discontinued when one assembling step has been completed, a state of assembling elements can be maintained. In addition, the assembling operation in a following step can accurately position elements which have been assembled in a preceding step, so that a work of the preceding step does not require a high degree of accuracy and the assemblage is easy. In addition, the process of the present invention does not involve such a difficulty that the apparatus core is directly mounted to the case. Thus, the elastic elements can be easily provided as vibrationproof measures between the supports and the apparatus core, so that the vibrationproof measures can be easily provided even when the apparatus core is a CD autochanger.

BRIEF DESCRIPTION OF THE DRAWINGS

FIG. 2 is a perspective view of a joint of a notch in a support and a claw of a lower case;

FIG. 3 is a cross-sectional view of the joint of FIG. 2;

FIG. 4 is a perspective view of a joint of a trapezoidal opening in the support and the claw in the lower case;

FIG. 5 is a cross-sectional view of the joint of FIG. 4;

FIG. 6 is a perspective view of a claw having a tapering portion and the surroundings provided on a rear wall of an upper case;

FIG. 7 is a plan view of the claw and the surroundings of FIG. 6;

FIG. 8 is a cross-sectional view of a state (an open state) of engaging rear walls of the upper and lower cases;

FIG. 9 is a perspective view of the state (the open state) of engaging the rear walls of the upper and lower cases;

FIG. 10 is a cross-sectional view of a state (a closed state) of engaging the rear walls of the upper and lower cases;

FIG. 11 is a perspective view of the state (the closed state) of engaging the rear walls of the upper and lower cases;

FIG. 12 is a perspective view of a joint of a claw of the upper case and a claw of the support;

FIG. 13 is a cross-sectional view of the joint of FIG. 12;

FIG. 14 is a cross-sectional view of a state of engaging a rectangular opening in the lower case and the claw of the upper case;

FIG. 15 is a cross-sectional view of a state of engaging the upper case, the support and the lower case after the case assembly has been assembled.

DESCRIPTION OF THE PREFERRED EMBODIMENTS

EXAMPLE

Figure 16:
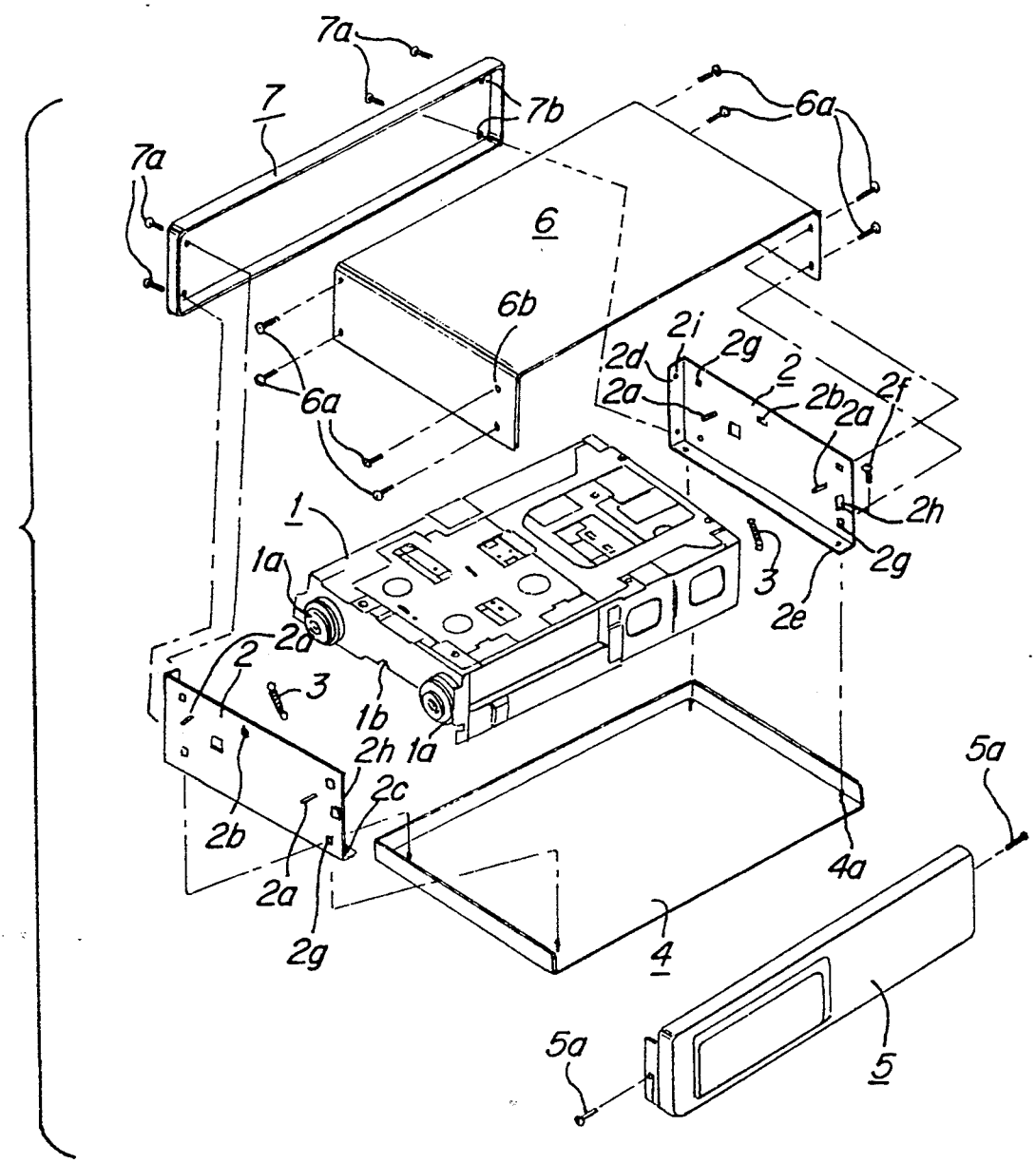
FIG. 16 is an exploded perspective view of a prior-art assembling structure of a case.

An EXAMPLE of the present invention will be described in detail with reference to FIGS. 1–15 hereinafter. The same elements of FIGS. 1–15 as those of FIG. 16 have the same labels and descriptions of these elements will not be repeated.

Figure 1:
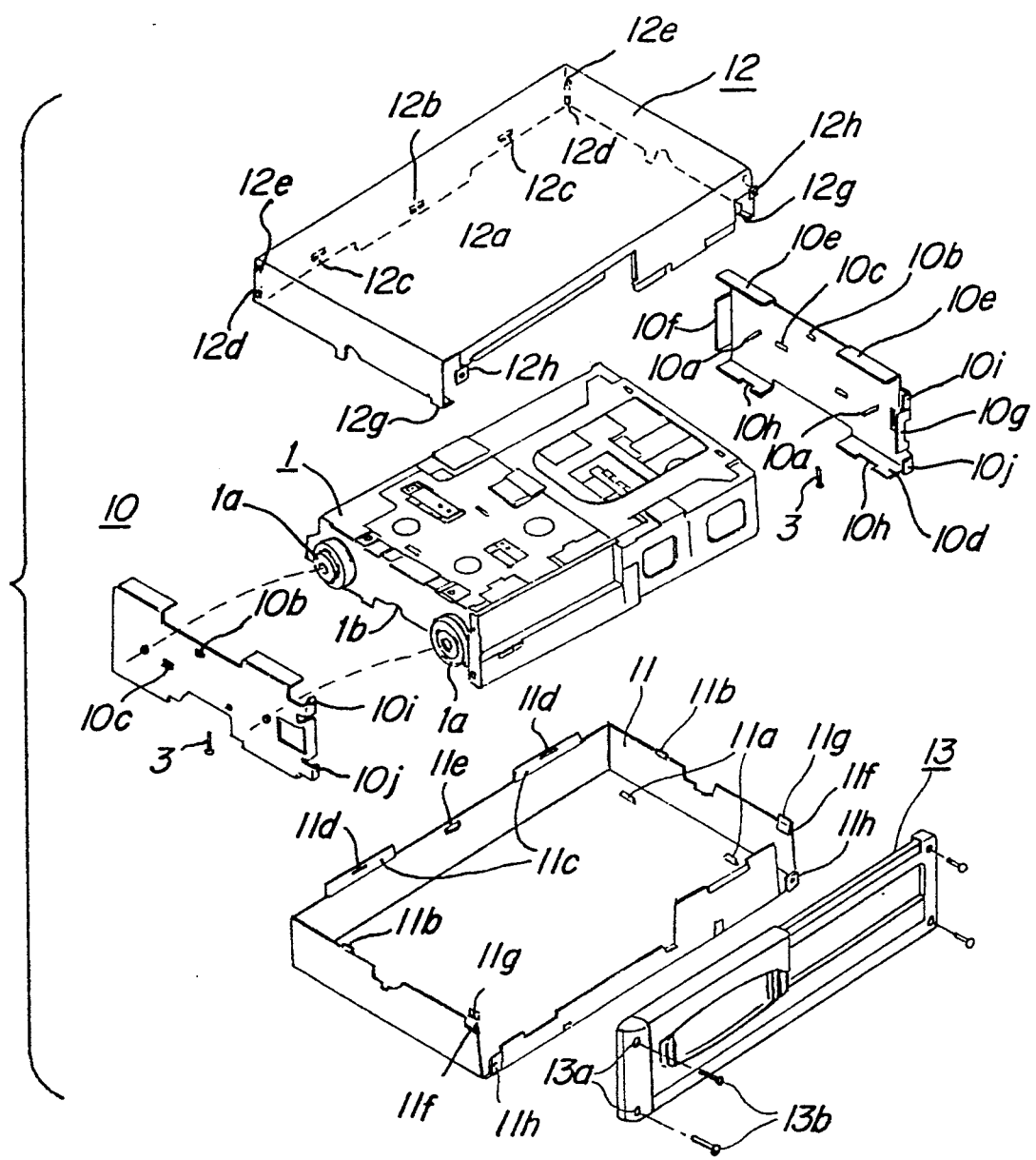
FIG. 1 is an exploded perspective view of an assembling structure of a case assembly according to an embodiment of the present invention.

In the present EXAMPLE, the core 1 of an apparatus contained within a case assembly is a conventional CD autochanger, as shown in FIG. 1. A pair of right-hand and left-hand supports 10 are attached to the opposite side surfaces of the apparatus core 1. Elastic elements maintaining the position of the apparatus core 1 are mounted between the supports 10 and the apparatus core 1. The opposite side surfaces of the apparatus core 1 support the supports 10 via the elastic elements. The case assembly contains the apparatus core 1, the supports 10 and the elastic elements. The case assembly comprises a lower case portion (referred to as lower case hereinafter) 11, an upper case portion (referred to as upper case hereinafter) 12, and a front panel 13 constituting the front of the case assembly. The lower case 11 is essentially a box the top portion of which is opened in order to constitute a lower portion of the case assembly. That is, the lower case comprises two sidewalls and a rear wall. The upper case 12 is essentially a box the bottom portion of which is opened in order to constitute an upper portion of the case assembly. The upper case 12 also comprises opposite sidewalls and a rear wall.

A surface of each of the supports 10 opposed to the apparatus core 1 has pins 10a fitting the central openings in the dampers 1a, and a claw 10b engaging a spring 3. All of the pins 10a and the claw 10b are provided at the same predetermined places as at those in the prior art. Each of the supports 10 has at essentially the center thereof a trapezoidal opening 10c engaging a claw 11b formed on the lower case 11. The four sides of each of the supports 10 have bent portions 10d, 10e, 10f and 10g projecting to the apparatus core 1.

The bottom edge of the support 10 has first bent portions 10d. The innermost edge of each of the first bent portions 10d defines a notch 10h. The notches 10h engage claws 11a provided on the bottom surface of the lower case 11. The top edge of the support 10 has second bent portions 10e. The second bent portions 10e are brought into contact with the ceiling surface of the upper case 12 when the case assembly has been assembled. The rear end of the support 10 has a third bent portion 10f. The third bent portions 10f are brought into contact with the rear walls of the lower case 11 and the upper case 12. Portions between the bent portions 10f and 10e engage tapering claws 12e provided on the upper case 12. The front end of the support 10 has a fourth bent portion 10g. A part of the fourth bent portion 10g constitutes two claw-shaped upper and lower projections 10i and 10j to which the front panel 13 is screwed.

Right-hand and left-hand parts of the bottom surface of the lower case 11 have upright claws 11a engaging notches 10h in the supports 10. FIGS. 2 and 3 show a state of engaging the notch 10h with the claw 11a. The top edges of the right-hand and left-hand sidewalls of the lower case 11 have claws 11b engaging trapezoidal openings 10c defined at essentially the centers of the supports 10. As shown in FIG. 5, a lower portion of each of the claws 11b is bent and extends just the thickness of the support 10 to the apparatus core 1. FIGS. 4 and 5 show a state of engaging the trapezoidal opening 10c with the claw 11b.

The top edge of the rear wall of the lower case 11 has a pair of right-hand and left-hand upright engagement projections 11c. The substantial center of each of the o engagement projections 11c has a hook or claw 11d projecting rearward. The center of the rear wall of the lower case 11 has a rectangular opening 11e. The engagement projections 11c, the hooks 11d and the rectangular openings 11e constitute a means for engaging the lower case 11 with the upper case 12.

Front panel 13 side parts of the top edges of the right-hand and left-hand sidewalls of the lower case 11 have upright claws 11g the bottom ends of which have rectangular openings 11f. The claws 11g also constitute the means for engaging the lower case 11 with the upper case 12. A part of the front wall of the lower case 11 opposed to a magazine inserting opening in the front panel 13 is cut out. Right-hand and left-hand ends of the front wall of the lower case 11 have claws 11h screwed to the front panel 13. A rear portion of each of the claws 11h is bent forwards and extends a predetermined length so as to engage the claws 10i of the supports 10.

A central part of the bottom edge of the rear wall of the upper case 12 forms a downward engagement projection 12a. Essentially the center of the engagement projection 12a has a claw 12b projecting rearward. The claw 12b engages the rectangular opening 11e provided at the center of the rear wall of the lower case 11. Predetermined right-hand and left-hand parts to the engagement projection 12a has rectangular openings 12c. The rectangular opening 12c engages the hook 11d on the engagement projection 11c of the lower case 11.

The right-hand and the left-hand ends of the rear wall of the upper case 12 have ribs 12d reinforcing corners. The top edge of each of the ribs 12d has a claw 12e projecting forward. As shown in FIGS. 6 and 7, the claw 12e comprises a tapering portion 12f. The tapering portion 12f and a corresponding sidewall of the upper case 12 define a clearance therebetween corresponding to the thickness t of the support 10.

The bottom edges of the front panel 13 side ends of the right-hand and left-hand sidewalls of the upper case 12 have claws 12g projecting inward. The claws 12g are designed to engage the rectangular openings 11f defined in the lower case 11. A part of the front wall of the upper case 12 opposed to the magazine insertion opening defined in the front panel 13 is cut out. The right-hand and left-hand ends of the upper case 12 have claws 12h screwed to the front panel 13. Rear portions of the claws 12h are bent forward and extend a predetermined length so as to engage the claws 10i of the supports 10 as those of the claws 11h of the front wall of the lower case 11 are done.

The case assembly having the above-described assembling structure according to the present EXAMPLE is assembled by the following assembling process. The pins 10a of the supports 10 are fitted into the central insertion openings in the dampers 1a of the apparatus core 1 and the springs 3 are engaged with the claws 1b of the apparatus core 1 and with the claws 10b of the supports 10. Thereby, the supports 10 support the right-hand and left-hand side surfaces of the apparatus core 1 at a degree of freedom.

The supports 10 sandwiching the apparatus core 1 are then fitted into the lower case 11. That is, the supports 10 are fitted into the lower case 11 so that the notches 10h at the innermost edges of the first bent portions 10d provided on the bottom edges of the supports 10 engage the claws 11a on the bottom surface of the lower case 11 (see FIG. 2) and so that the claws 11b of the lower case 11 engage the trapezoidal openings 10c defined in the supports 10 (see FIG. 4). The above-described assembling step is a first assembling step.

In the first assembling step, since the claws 11a on the bottom surface of the lower case 11 fasten the innermost edges of the first bent portions 10d of the supports 10, the bottom edges of the supports 10 can be prevented from an inward displacement. In addition, engaging the claws 11b of the lower case 11 with the trapezoidal openings 10c defined in the supports 10 can prevent the top edges of the supports 10 from being displaced inward.

Then, the assemblage of the case assembly goes to a second assembling step. In this assembling step, the upper case 12 is fitted onto the apparatus core 1 and the supports 10 from above. That is, the bottom edge of the rear wall of the upper case 12, as shown in FIGS. 8 and 9, is brought into contact with the top edge of the rear wall of the lower case 11 and the engagement projection 12a, the claw 12b and the rectangular openings 12c of the upper case 12 are engaged with the engagement projections 11c, the hooks 11d and the rectangular opening 11e of the lower case 11. Thereby, the projecting and recessed arrangements of all of the engagements 11e and 12a engage each other to position the upper case 12 and the lower case 11 in horizontal direction.

In this state, when the upper case 12 and the lower case 11 are moved in a closing direction, the claws 12e having the tapering portions 12f attached to the rear wall of the upper case 12 engage the rear ends of the supports 10. In the second assembling step, the tapering portions 12f of the claws 12e guide the supports 10 even if the supports 10 are slightly inclined inward. Thus, the supports 10 are raised up to predetermined positions and fitted into the clearances between the rear ends of the tapering portions 12f and the sidewalls of the upper case 12. Thus, the top edges of the rear ends of the supports 10 are prevented from being displaced inward.

The upper case 12 and the lower case 11 are further moved in the closing direction. Thus, the assemblage of the case assembly goes to a third assembling step in which the sidewalls of the cases 11 and 12 are fitted each other via the supports 10. As shown in FIG. 8, abutting portions of the top and bottom edges of the rear walls of the cases 11 and 12 together serve as a virtual hinge so that in the closed position of the cases 11 and 12 the hooks of the cases 11 and 12, as shown in FIGS. 10 and 11, engage the rectangular openings in the cases 11 and 12. Thus, the upper case 12 and the lower case 11 are securely fastened to each other against a vertical tension.

After completion of the third assembling step, the assemblage of the case assembly goes to a fourth assembling step. In this step, the claws 12h provided at the right-hand and the left-hand ends of the front wall of the upper case 12, as shown in FIGS. 12 and 13, engage the claws 10i of the supports 10. Thereby, the forward bent portions of the claws 12h of the upper case 12 and the top edges of the front ends of the supports 10 are prevented from being displaced inward.

In addition, the claws 12g of the upper case 12, as shown in FIG. 14, engage the rectangular openings 11f provided at the front panel 13 side top edges of the right-hand and the left-hand sidewalls of the lower case 11 so that the cases 11 and 12 are fully closed. At this time, the front panel 13 can be attached to the front walls of the lower case 11 and the upper case 12. In other words, the front panel 13 is finally attached. In this attaching step, the front panel 13 is first applied to the lower case 11 and the upper case 12 from the fronts of the cases 11 and 12. The screws 13b are subsequently inserted into the screwed holes 13a defined in the four corners of the front panel 13 and the front panel 13 is screwed to the supports 10 via the openings in the upper case 12 and in the lower case 11. The assemblage of the case assembly is completed through the above-described assembling steps. FIG. 15 is a cross-sectional view of a state after the case assembly has been assembled.

If the case assembly assembled as described above is reopened, a minus screw driver, for example, may be inserted into places near the sidewalls or the claws leg 12g of the upper case 12 and the claws 12g of the upper case 12 may be disengaged from the rectangular openings 11f in the lower case 11.

In the present embodiment, the engagements of the supports 10, the lower case 11 and the upper case 12 prevent the supports 10 from being inclined to the apparatus core 1 and fasten the supports 10 in place. Since the ceiling surface of the upper case 12 is in a position to depress the top surfaces 10e of the supports 10 when the upper case 12 and the lower case 11 are fully closed, the supports 10 cannot be vertically moved within the case assembly and stably supported.

In particular, by the assembling process according to the present embodiment, a set of the apparatus core 1 and the supports 10, a set of the supports 10 and the lower case 11, and a set of the lower case 11 and the upper case 12 can be sequentially assembled. In addition, since the state of assembling the components of the case assembly is maintained even if a work is discontinued at the completion of any assembling step, a lining of the assembling process of the present embodiment is very advantageous. In addition, since the assembling in the following step accurately positions the components assembled in the preceding step, the work in the preceding step does not require a high accuracy so that the assemblage of the case assembly is easy. Even if there is, e.g., a slight error in a distance (the size in width) between the apparatus core 1 and each of the supports 10 when the apparatus core 1 and the supports 10 are assembled, the supports 10 are positioned during fitting of the lower case 11. In addition, even if a relative position in depth of the lower case 11 and each of the supports 10 or a position in width of the top edge of each of the supports 10 is loose during fitting together of the lower case 11 and the supports 10, the upper case 12 can be accurately positioned during fitting thereof.

Since the present embodiment is not a fastening process employing a large number screws unlike the prior-art process, it very simplifies the assembling steps and solve the problem that a component may slip off during assemblage of the case assembly. In addition, since only the four screws attached to the front panel are employed and have the same tightening direction, an intermediate product need not be rearranged during screwing. In addition, since the present embodiment can prevent a trouble such as a slackness or slippage of screws to cause no secondary failure.

OTHER EMBODIMENTS

The present invention is not restricted to the above embodiment. For example, the configurations and the positions of the joints of the supports and each of the lower case and the upper case can be appropriately selected. In a word, the present invention is characterized in that during fitting together of the upper case and the lower case by means of only the engagements of the claws and the openings, the supports are fastened within the case assembly by means of only the engagements of the claws and the openings, and that the assemblage of the upper case and the lower case directly positions the supports. Accordingly, the supports may be fastened to the bottom surface of the lower case by means of a claw and an opening only positioning in the depth of the case assembly and the upper case may have a claw and an opening positioning the supports in the width of the case assembly.

In addition, the present invention is on the premise that the assembly of the upper case and the supports cannot disassemble in a state that the upper case positions at least one of the supports. Thus, the present invention is clearly distinguished from an art in which the supports may fall and even an unidirectional positioning of the supports cannot be succeeded unless both the upper case and the lower case support the supports.

Thus, the case assembly of the present invention does not always require the presence of the front panel nor the virtual hinge between the upper case and the lower case. The present invention comprises, e.g., an embodiment in which even if the upper case simply covers the lower case from above a fastening means fastens the two cases and the upper case can position the supports.

In addition, the case assembly of the present invention, of course, can be widely used as not only a case for a CD autochanger but also a case of a type containing an apparatus core which has been mounted to supports.

What is claimed is:
1. A case assembly of an electronic apparatus, wherein the case assembly comprises:
   the case having at least an upper case portion and a lower case portion having respective sidewalls;
   the sidewall of the lower case portion having an upward engagement projection (11c) overlapping the sidewall of the upper case portion and a claw (11d) at a part of the engagement projection,
   the sidewall of the upper case portion having a downward engagement projection (12a) overlapping the sidewall of the lower case portion and a claw (12b) at a part of the engagement projection,
   the sidewall of the lower case portion having an opening (11e) which engages the claw (12b) of the upper case portion,
   the sidewall of the upper case portion having an opening (12c) which engages the claw (11d) of the lower case portion, and
   the engagement projection (11c) of the lower case portion and the engagement projection (12a) of the upper case portion overlapping to provide a hinge connection when the upper case portion is fitted on the lower case portion during assembly of the case;

support means connecting and supporting at least one of the upper and lower case portions provided in the case;

at least one of the support means and the lower case portion having first positioning means (10h, 11a, and 10, 11b) for positioning the support means in a horizontal direction to the lower case portion, and the first positioning means engaging a part of the other one of the support means and the lower case portion; and at least one of the support means and the upper case portion having second positioning means (12e and 10i, 12h) for positioning the support means in a vertical direction to the upper case portion, and the second positioning means engaging a part of the other one of the support means and the upper case portion.

2. The case assembly of claim 1, wherein the support means includes third positioning means (10d, 10e) for positioning the support means vertically to the lower case portion; the third positioning means being vertically contacted by each case portion, when both the upper case portion and the lower case portion are composed as a complete case.

3. The case assembly of claim 1, wherein the first positioning means and the second positioning means are selected among a group composed of claws (10i, 11a, 11b, 12e, 12h), openings (10c), and notches (10h).

4. The case assembly structure of claim 1 further including a face plate for interconnecting the upper case portion and the lower case portion and fastening means only extending through the face plate to permanently interconnect the upper case portion and lower case portion.

5. The case assembly structure of claim 4 wherein the fastening means are screws.

* * * * *